Aug. 4, 1931.  H. V. THADEN  1,817,653
AIRCRAFT SHEET METAL SEAM
Filed Nov. 26, 1926  2 Sheets-Sheet 1
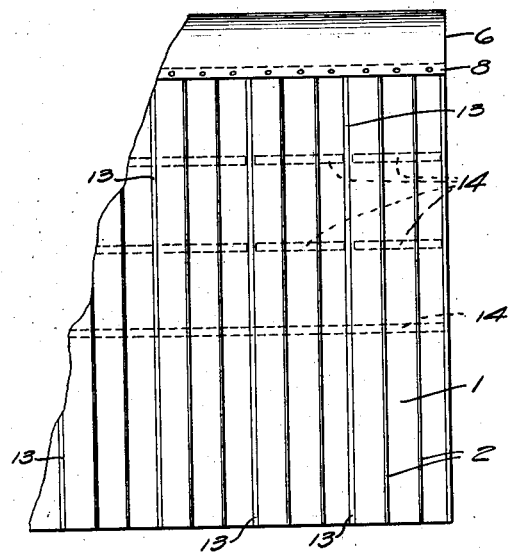
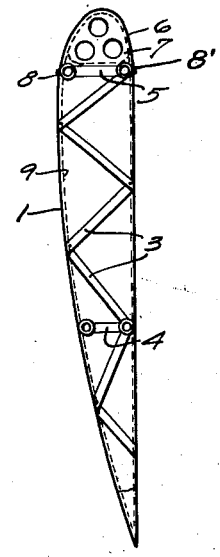
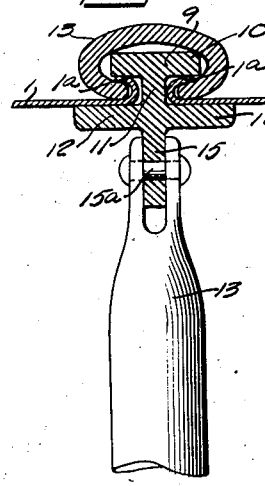
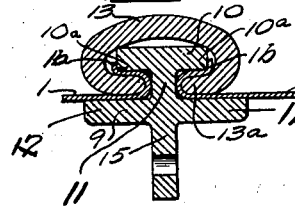
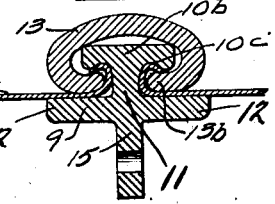
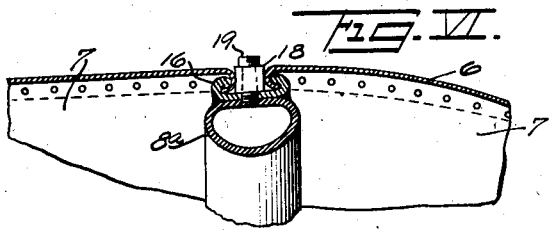
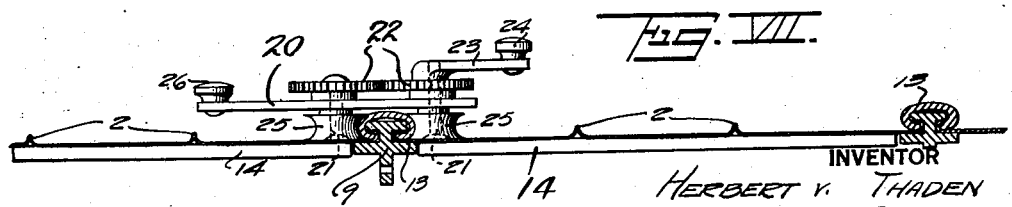
INVENTOR
HERBERT V. THADEN
BY
ATTORNEY Aug. 4, 1931.　　　　H. V. THADEN　　　　1,817,653
AIRCRAFT SHEET METAL SEAM
Filed Nov. 26, 1926　　2 Sheets-Sheet 2
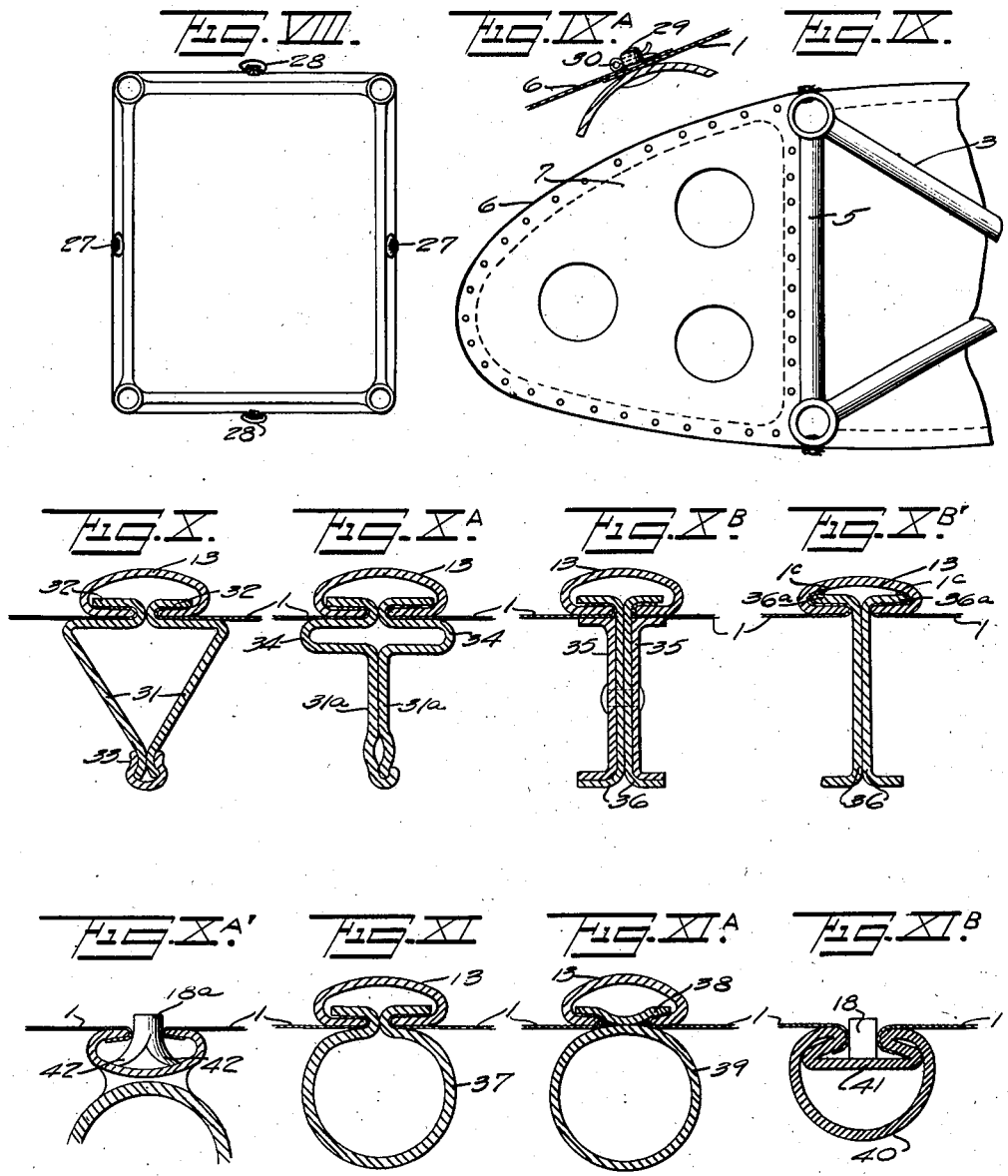
INVENTOR
HERBERT V. THADEN
BY
his ATTORNEY Patented Aug. 4, 1931

1,817,653

UNITED STATES PATENT OFFICE

HERBERT V. THADEN, OF DETROIT, MICHIGAN, ASSIGNOR TO GENERAL AVIATION CORPORATION, OF NEW YORK, N. Y., A CORPORATION OF DELAWARE

AIRCRAFT SHEET METAL SEAM

Application filed November 26, 1926. Serial No. 150,699.

This invention relates to the securing of metal sheathing on aircraft. In particular, the objects of the method and construction involving these inventions include the securing of the edges of sheets of metal in a more effective manner than heretofore, at low cost of application and in a way that permits the removal and repairing by ordinary mechanics in the field, simplifying the maintenance and to make possible the very important item of accessibility to the interior of metal-covered parts for inspection even on the field. For lighter-than-air craft extremely thin metal sheathing is essential for lightness, and in heavier-than-air craft it is desirable to use very thin sheathing, sufficient for the aerodynamic strains, but where the sheet metal must, if possible, be so thin that the necessary size of rivets heretofore used permit the tearing away of the sheet, besides affording no means of removal for inspection or replacement without ruining the sheet edge. In the practice of this invention it permits the use of flat sheets of thin metal instead of using corrugated and heavier sheets.

In particular, in the case of airplane wings the embodiment of my inventions permit most efficient, economical and strong attachment of the upper and lower surface sections of sheet, and much improved securing of the leading-edge of the wing, all for the advantage of inspection, replacement and repair, and to make possible the use of thinner, and thereby lighter sheet metal than has heretofore been possible. This applied also to pontoons as well as bodies of fuselages where light weight is of the essence.

In the securing of sheet metal in other arts, there has not been the necessity of using such very light sheet as is desired or essential for aircraft, but on the contrary methods of crimping sheet edges of such weight and strength that the inherent strength of the edged crimp serves the purpose because only a watertight joint, or in any event a joint to resist much less strain was involved.

However, in the case of aircraft, the structures involve the finest consideration of matters of weight. Thus very light sheet has been developed, and as in the case of duralumin its physical characteristics are such that its lightness cannot be offset by added weight as at the seams. It becomes a fine question as to having the minimum of seam weight, and I have found that this becomes practical with my invention by keeping the weight sufficient to provide a seam strength that will withstand a load slightly over the load at which the sheet reaches its elastic limit. While possible to make the seam so strong as to resist loads up to the ultimate strength of the sheet, this would add materially to the weight of the seam members, and in many cases a prohibitive weight.

My invention, however, realizes the advantages in constructions herein shown and described which to an extent are typical and subject to variations without departing from my invention.

For illustration of particular embodiments of my method and structure, the accompanying drawings illustrate:

Fig. I—a fragmentary top view of an airplane wing.

Fig. II—a fore and aft cross-section of Fig. I.

Fig. III is an enlarged cross-section of one form of joint showing the connection of two sheet edges to a stiff or rigid rib.

Fig. IV—a like enlarged section slightly modified.

Fig. V—a like enlarged section slightly modified.

Fig. VI—a cross-section of modified form of joint at the junction of wing surface and leading edge sheet.

Fig. VII—shows a cross-section on a smaller scale of an entire sheet as secured to adjacent ribs, with one form of tool in position effecting the method of attachment of the sheet edges.

Fig. VIII—a cross-section on a smaller scale of the main parts of a fuselage rectangular structure with the improved sheathing joints involving my invention.

Fig. IX is an enlarged vertical section windwise, of the leading-edge of a wing, showing an alternate form of attachment construction compared with that shown in Fig. VI; and Fig. IX$^a$ is a fragmentary sectional view on a still larger scale of the attaching connections.

Figs. X—X$^a$—X$^{a'}$—X$^b$—X$^{b'}$ are modified forms in cross-section of sheet metal ribs adapted for the mechanical sheet edge securing seam.

Figs. XI—XI$^a$—XI$^b$ are modified forms of sections of tubular frame members adapted for the sheet metal seam connection.

While the seam construction may be used in various ways and particularly meets the exacting requirements of aircraft, either in lighter-than-air craft or heavier-than-air craft, I have illustrated in the accompanying drawings part of an airplane wing in Figs. I and II, in which is shown thin sheet metal plates 1 with corrugations 2 in the direction of the air-flow, with interior frame lattice 3 and with wing girders 4 and 5, wherein 5 is the forward girder near maximum depth of wing and to which is attached a leading-edge 6 formed of one sheet which at intervals has a form-maintaining rib plate 7, while the sheet edges 8 and 8' carry over the top and bottom of the girder 5, and are detachably secured thereto, as hereinafter described. The main wing surface sheets 1 are secured to ribs 9 extending from front to rear of the wing. While the edges of the sheet panels are thus firmly secured, and the corrugations 2 or similar beading gives rigidity in one direction to the sheets, there may be one or more transverse ribs 14—14, shown in dotted lines in Fig. I, attached by riveting, clamping or the like to the inside surface of each sheet panel. These stiffeners 14 may be of any desired section, preferably as indicated in Fig. VII, as an angle iron with one leg at right angles to the inner surface of the sheet.

These ribs 9 may be variously formed, as, for example, shown in Figs. III, IV and V, wherein the rib 9 has a head 10 and a web 11 with flanges 12—12 forming rigid recesses between their top surface and the undersurface of the head 9. These recesses provide accommodations for the edge of the sheets 1—1 with reverse bends 1$^a$—1$^a$ adapted to be engaged by constricting edges of a clamp strip 13.

This clamping strip is preferably of rolled steel or properly heat treated duralumin which deformed into the clamping position is of ample strength to resist spreading, and which when compressed bites the grooved edges of the thin sheet metal and forces them into the fixed grooves in the rib between the underside of the head 10 and the juxtaposed top surface of the flanges 12—12. The rib is preferably made of extruded aluminum section of much greater section than the sheet metal gauge and of such relative strength that the C clamp 13, when having its edges deformed and constricted to "bite" the edges of the sheet metal, will assure an unyielding rigid clamping of the sheet metal edges within the relatively fixed grooves under the pressure of the edges of the C clamp 13. It will be understood that with respect to aircraft we are here dealing with extremely light sheet metal in the order of one hundredth of an inch, or less, in thickness, and therefore the ribs, at spaced intervals, may be considerably heavier and therefore relatively rigid, without material by adding to the total weight of the structure, and also a steel strip in the form of a C clamp of a section that will provide a strength and rigidity when forcibly deformed into a locking position, is also only necessary at spaced intervals, and therefore involves no more than a readily permissible weight to provide the necessary strength for its functioning as a sheet edge seal and clamp.

Thus the rib 9 with the C clamp 13 provide for the continuous gripping of the edges of the adjacent very thin sheet metal sheathing 1—1. Such gripping is effected by the permanent deformation of the C clamp, preferably of sheet steel strip, but any other suitable permanently deformable material, and such application of the clamping strip is readily accomplished by tools that will set the metal of the clamping strip by local excesive pressure, as, for example, by the tool illustrated in Fig. VII. This tool may be run along the seam, and in one operation closes in the C clamping strip to its locking position with such a hold that the engaged edges of the sheet metal are held with a resistance in excess of the elastic limit of the sheet metal itself. It has been found that the necessary rib strength for rigidity of the clamp, and the necessary weight of C clamp required for such a seam, are relatively light in weight in order to equal or exceed the elastic limit of the light gauges of sheathing, particularly such as are used in airplane wings, such as aluminum alloy and particularly duralumin.

The particular advantage involves a continuous clamping, and a uniform gripping of the edge of the sheet, as compared with the practice heretofore of inserting rivets at intervals, which, of course, cuts away a percentage of the sheet metal edge and only provides the strength at separated points where the remaining edge section engages a rivet. This continuous clamping by a rigid grip of sheet metal edge is also of great advantage over a soldered joint because the very thin sheet when soldered loses greatly in strength due to the heat of soldering, but above all any possible effective soldering precludes any release of the joint without complete mutilation of the edge of the sheet.

The herein described clamping joint seams permit of the opening of the joints without permanent injury to the edge of the sheet and without injury to the internal molecular structure of material of the sheet edge. While the opening of the seam may require deformation of the C clamp, in many cases such C clamp may be reused, but even if new clamps are required for effectiveness or convenience, it does not involve the replacement of the expensive thin sheathing. Furthermore, the C clamps may be so proportioned that the cooperating rib grooves are of such strength that they will be longer lasting, that is the last to deform, so that the ridges which form the permanent structure of airplane wings are substantially permanent elements, and therefore permit the application and the replacement of the sheathing plates whenever necessary.

Such replaceable joints being provided for the edges of the sheet which form the leading-edge of the wing, make possible the removal of the entire leading-edge, or sections of the leading-edge so that the interior of the wing is accessible for inspection, and may readily be inspected on the field without the necessity of retiring the plane to the shops for the present-day laborious and expensive method of overhauling, or purely for inspection.

In the case of airplane wings, stiffeners 14 may be provided between the main ribs 9, which in conjunction with the crimps 2—2 produce a non-deformable surface smooth in the direction of the air-flow and amply resisting the aerodynamic pressures, and so constructed they make possible in conjunction with the form of seam herein described, a most advantageous wing covering which resists all strains involved with the minimum weight of sheathing. With this, and the fact that the C clamp assures the full strength at the seam of the entire sheet edge, are the important advantages that it permits the use of very thin gauge sheathing and simplifies the maintenance, and makes it possible for repairs to be made by ordinary mechanics in the field and facilitates inspection of the interior of the space encased with sheathing secured in this manner.

In the various forms of embodiment of my invention, in the case of airplane wings the ribs 9 may have the additional web 15 to which braces, such as the tubular braces 3, may be readily attached as by rivets 15ª. Thus the stiff ribs 9 provide admirably for the wing-frame structure and at the same time the fixed relatively rigid flanges 10 and 12 provide a recess for engagement of the C sheathing edges under pressure of the C clamp edges forced in with material that will maintain its set and provide all the necessary strength in each particular case.

In Fig. IV the sheet edge is not alone bent over at 1ª, but also has a small return-bend 1ᵇ which catches on the corner 10ª of the rib-head 10. In this case there will be added assurance in the exact positioning of the edge of the sheet with respect to the rib, so that in setting up the C clamp 13 there is the assurance that a uniform margin of sheet edge will be tightly clamped by the C clamp edges 13ª into the groove between the head and the flange 9 on the rib. In Fig. V the head 10ᵇ is formed with an under-cut head as at 10ᶜ, and in this case the edges 13ᵇ of the C clamp curl up under the head in a way that in some cases better provides for the natural curling of C clamp edges as they are forced into their locking position, and also assures an under-gripping of the rib-head to better resist displacement in a way that such modified form might be used for more permanency of seam, and where there is less likelihood of desiring the opening of the seam for inspection or repair.

In Fig. VI the rib 16 is a trough section which is welded or brazed to the main frame member 8ª, and the sheathing of the leading edge 6 is bent inwardly into this trough member, while the front edge of the sheet 1 is also bent in to the other side and between them a wedge bar 18 is forced with screws 19 that force and hold the bar in its locking position. With this modified form the clamping of the seam edges is effected in a way permitting easier release, and in the case of the forward edge of an airplane wing it provides most advantageously for its removal for repair or for inspection of the interior of the wing at any time even in the field.

The method of setting up the C clamp in the forms shown in Figs. III, IV and V, will be understood from the hand apparatus shown in one form in Fig. VII. A bracket 20 supports shafts 21—21 rotatable simultaneously by interconnection of gears 22—22, one shaft being rotatable by crank 23 and handle 24, while rollers 25—25 are recessed on their face in the desired shape to engage the C clamp 13. By driving one of the rollers, both are rolled along the edge of the C clamp 13 bending it and forcing its edges to press against the edges of the sheet and force them into the groove between the underside of the rib-head and the top of the flange. The bracket 20 of this hand-setting tool is of such length that the centre-to-centre distance of the rollers may during the first part of the operation be wider apart than necessary for the finishing of the joint, and by changing the angle of the bar with respect to the rib, as by manipulating the grip 26 the rollers can be gradually brought to the desired position of operation for finishing the setting of the C clamp.

In the case of sheathing enclosing a box frame, as shown in Fig. VIII, as, for example, in the fuselage or body of an airplane, the sheathing is suitably positioned around the frame, and seam clamps 27 secure their adjacent edges without any rivets. These clamps 27 may have the flush outside flange of a rib with the C clamp pressed into locking position on the inside, and after suitably finishing such a sheathed box structure on several sides, the last seam or seams, as 28, can be closed with the C clamp applied on the outside. In any event the particular seam or seams that it is considered should be most readily acceptable for opening for inspection or repair, can have the clamping member on the outside, while all of the others can be arranged to present a substantially flush outside finish.

In the case of a wing leading-edge as shown in Fig. IX, and in more detail in Fig. IX$^a$ the nose may have the stiff rib 7 secured to the inside surface of the sheathing 6, providing permanency of the exact nose section with the edge of the sheet overlapping the front edge of the main wing section sheets, and secured thereto and to the wing frame members by the engagement with a series of pins 29 brazed into the rigid frame member and with suitable means to secure the sheet edges on the pin as by a cotter 30. In this case the front pressure forces the nose and sheathing 6 against the wing frame so that there is little or no tensile strength at the seam, and permits the more ready-removal means, such as the pin and cotter construction shown.

The variations in form shown in the other drawings will depend upon the particular characteristics of seams and their strains and the desired rib construction. As in Fig. X, two rib members 31 formed sufficiently rigid to maintain the recessed clamping edges 32 have the C clamp 15 coacting to grip the edges of the sheathing 1 and hold the rib edges together, while the other edge of the rib members may be clamped together with beading 33,—thus forming a light and stiff rib. In the form in Fig. X$^a$, the two-piece rib members 31$^a$—31$^a$ have the additional flange portion 34 providing for the C clamp recess-engagement and also adding to the stiffness of the rib.

In the case of the rib form in Fig. X$^b$, stiff trough plates 35 nest with trough plates 36, having their flanges along one edge suitably separated to provide the head and flange, between which the edges of sheets 1—1 are forced by C clamp 13. In the form shown in Fig. X$^b$, two trough plates 36 form the stiff rib with a single flange 36$^a$ for seam connection in such case where the edge of sheet 1 is bent double, that is a reverse bent edge 1$^c$ engages the top side of the flanges 36$^a$, while the edges of the C clamp 13 engage the underside of those flanges and thereby the setting-up by bending in of the C clamp locks the edge of the sheet in secure engagement with the rib-head.

In the case of the form shown in Fig. XI, the rib seam groove is formed on one side of a tubular strut or rib member 37, in a manner as shown for suitable engagement of the C clamp 13. In Fig. XI$^a$, as shown, a crimp-plate 38, welded or soldered to the tube 39, provides the necessary grooves for the engagement of sheet 1 edges to be locked therein by C clamp 13.

As shown in Fig. XI$^b$, a tubular strut or rib 40 is drawn into a shape or section having a reentrant groove 41 which provides interior recesses so that the sheet edges may be hooked in and held by a wedge bar such as 18. X$^{a'}$ shows a modified form in which the sheet edges curl into a groove, but in which the locking-bar forced between the edges and into the rigid groove recess has inner split sections 42—42 so fashioned that they spread, and thereby lock the bar when suitable pressure has been applied to effect the making of the joint. In this case facility for removal and replacement is less than when the bar is otherwise fastened as herein described, and this latter form applies where more permanency is desired.

It will thus be seen that I provide for the securing along the entire edge of thin sheathing by engaging means that form a seam in a simple manner and with rigidity, waterproof, and where desired in a manner that may be readily opened for replacement or repair, or to remove parts of the structure for internal inspection. The necessary stiffness of the seam-locking members, to produce a seam strength equal to the elastic limit of the sheet, involves only slight additional weight local to the seam. The ribs or members providing grooves for the seam may be extruded or otherwise suitably fashioned duralumin or other metal. The C clamp is preferably sheet steel such as cold rolled strip capable of taking a rigid "set" when under proper pressure, without appreciable loss of strength to maintain the necessary grip. All of the necessary parts and their material, for the purposes of these structures may be readily provided with certainty of uniform strength and other necessary characteristics. While I have described my invention with respect to parts of an airplane, particular forms of the seam are better suited for one place or another, but in any case of thin sheet metal structures, as in the case of dirigibles, or otherwise, the advantages of my invention may be realized by the adoption of one form or another of my seam structure with marked advantage as compared with riveting, welding, brazing or soldering heretofore used. In particular, a great advantage will be apparent from the fact that the opening-up of the seam may be accomplished without ruining the edge of the thin sheet. While in some forms the opening of the seam may occasion the mutilation of a part, such as the C clamp, such can be very readily replaced and constitutes a relatively cheap portion of the joint as compared with the high cost of very thin sheathing which is used in structures where my invention is most applicable. Heretofore the use of very thin sheathing has been recognized as advantageous per se, but its use has been prevented by the lack of suitable means of joining plates or sections of sheathing in a manner that would realize the utility and advantages of the sheet.

While various tools may be devised for more quickly, uniformly and economically closing seams in accordance with my invention, as well as tools for readily opening the seams, the method of practice of my invention will be readily understood from the accompanying drawings and description. Various modifications may be made without departing from my invention, but what I claim and desire to secure by Letters Patent is:

1. A seam for aircraft sheet metal edge union having an open end accommodating the release and insertion of a clamp, comprising a stiff rib with an open end permitting the release or insertion of a clamping member and having oppositely facing grooves substantially in the plane of the metal sheets, a C clamp of relatively heavy metal adapted to have its edges bent into the grooves from opposite directions and the recess in said grooves for the reception of the bent edges of the metal sheets, whereby the forceful contracting of the C clamp upon deformation causes cooperative engagement of its edges into the two grooves with forced pressure upon the entire sheet edges to lock them into engagement with the rib and whereby the C clamp may be longitudinally removed to release the sheet members in the seam without distortion or fracture of the sheet metal edges.

2. In aircraft structures, an open-ended rigid rib forming a part of the framing, supplemental means integral therewith and forming lateral grooves, thin metal sheets having their edges bent and with the bends engaging the grooves in the structural member and open at least at one end of said grooves, a coacting rigid locking bar of substantially greater thickness than the sheet metal and having reentrant edges engaging the bends in the edges of the thin sheet metal and with forced engagement into the sides of the grooves in the rigid structural member, whereby the rigid locking bar may be applied to exert compressing engagement with the thin sheet metal throughout the length of the seam, and may be disengaged to open the seam by sliding through the open end of the grooves on the rigid structural member without distortion of the locking bar.

3. In aircraft structure, a seam or union for the securing of thin metal sheathing, comprising a rigid rib having lateral grooves adapted to receive the edge of thin metal sheathing, a clamping bar of a thickness substantially greater than the thickness of the thin metal sheathing and bent over to a reentrant angle in the rib for engagement with a substantial surface of the edge of the thin metal sheathing and hold thereto by frictional contact with the clamping bar edge and the thin sheathing, and having an open end whereby the clamping bar may be longitudinally displaced and removed without mutilation of the edge of the metal sheathing.

In testimony whereof, I have signed my name to this application, this 18 day of October, 1926.

HERBERT V. THADEN.

CERTIFICATE OF CORRECTION.

Patent No. 1,817,653.                                Granted August 4, 1931, to

HERBERT V. THADEN.

It is hereby certified that error appears in the printed specification of the above numbered patent requiring correction as follows: Page 5, line 24, claim 1, before the word "edges" insert the words rounded smooth; and that the said Letters Patent should be read with this correction therein that the same may conform to the record of the case in the Patent Office.

Signed and sealed this 27th day of October, A. D. 1931.

(Seal)                                                              M. J. Moore,
Acting Commissioner of Patents.